United States Patent [19]

Zuber et al.

[11] Patent Number: 4,550,688
[45] Date of Patent: Nov. 5, 1985

[54] STEAM OUTLET CONNECTION FOR A STEAM GENERATOR

[75] Inventors: Thierry Zuber, Paris; René Traiteur, Ris Orangis, both of France

[73] Assignees: Novatome, Le Plessis-Robinson; Commissariat a l'Energie Atomique, Paris, both of France

[21] Appl. No.: 632,750

[22] Filed: Jul. 20, 1984

[30] Foreign Application Priority Data

Jul. 28, 1983 [FR] France .................................. 83 12476

[51] Int. Cl.⁴ ............................................. F22B 37/22
[52] U.S. Cl. .................................. 122/360; 122/31 R; 122/235 D; 122/379; 122/511
[58] Field of Search .................... 122/31 R, 32, 235 D, 122/360, 361, 362, 364, 365, 379, 504, 511, DIG. 11

[56] References Cited

U.S. PATENT DOCUMENTS

| | | | |
|---|---|---|---|
| 1,352,254 | 9/1920 | Emerson | 122/360 |
| 1,742,175 | 12/1929 | Cross | 122/511 |
| 1,988,659 | 1/1935 | LaMont | 122/235 D |
| 4,307,685 | 12/1981 | Robin et al. | 122/32 |
| 4,474,140 | 10/1984 | Sternfeld et al. | 122/31 R |
| 4,488,515 | 12/1984 | Swallow | 122/379 |

FOREIGN PATENT DOCUMENTS 1592203  5/1970  France .

Primary Examiner—Albert J. Makay
Assistant Examiner—Steven E. Warner
Attorney, Agent, or Firm—Pollock, Vande Sande & Priddy

[57] ABSTRACT

Steam outlet connection for connecting the outlet (5) of a tube of the bank of tubes of a steam generator to the pipe (8) connecting it to a steam header. The connection is of the T type with a straight portion (10) closed at one end and a side branch (19) connected to the pipe (8). The closed end of the straight portion (10) has an end wall (14) having a zone of sufficiently slight thickness to permit its perforation for the purpose of injecting a gas into the tube.

4 Claims, 4 Drawing Figures

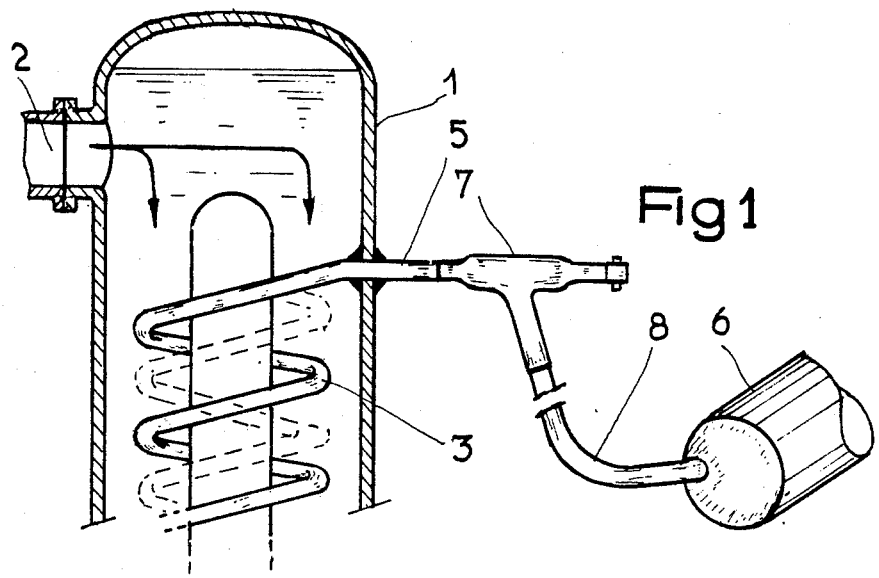
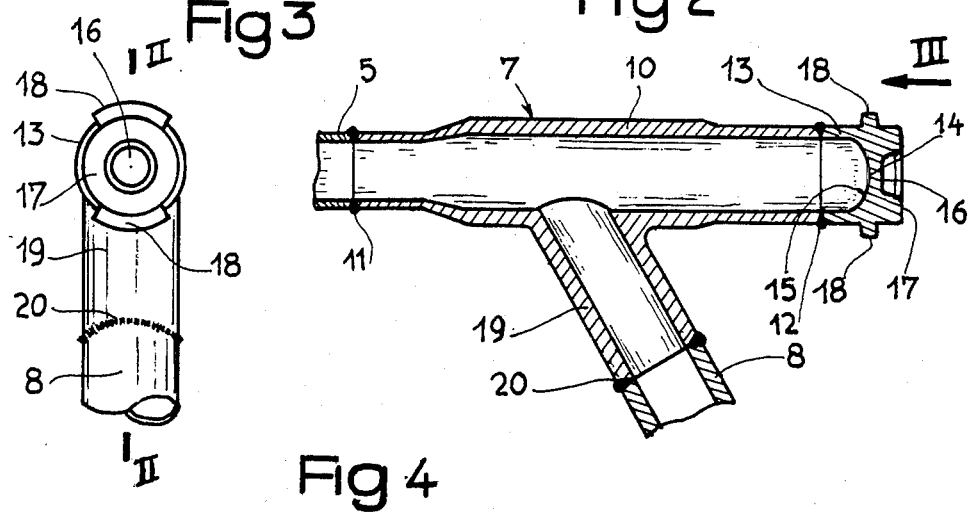
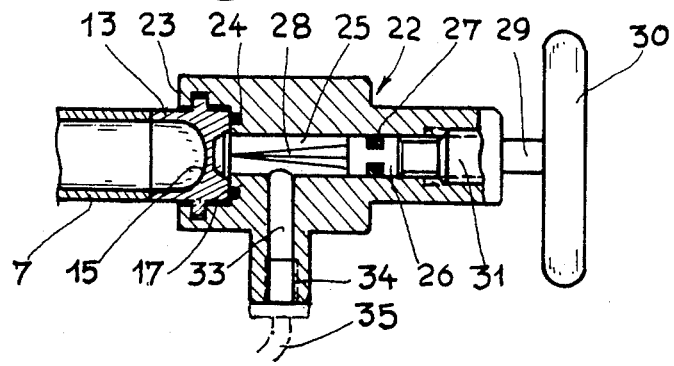

STEAM OUTLET CONNECTION FOR A STEAM GENERATOR

FIELD OF THE INVENTION

The invention relates to a steam outlet connection intended more particularly for use at the outlet of a tube of the bank of tubes of a steam generator.

BACKGROUND OF THE INVENTION

Steam generators are generally composed of an elongate vessel containing a bank of tubes. A heat transfer fluid circulates in the vessel and gives up its heat to water circulating in the bank of tubes in order to convert it into steam. The tubes of the bank of tubes generally pass out of the steam generator at both ends; pressurized water is introduced at one of their ends and the superheated steam passes out at the other end. Headers collect the steam coming from the tubes of the bank.

The invention relates more particularly to the connection of the steam outlets of the tubes of the tube bank to the steam headers.

Various arrangements have already been proposed for the connection of these tubes to the steam headers, but these arrangements do not generally permit easy intervention when these tubes have to be subjected to leaktightness tests.

Thus, connections of a general T-shape, connecting the steam outlet tubes of a generator to the headers, are already known, for example from French Pat. No. 1,592,203 they are composed on the one hand of a straight length of tube, one end of which is connected to the end of the steam outlet tube, while its other end is closed with the aid of a removable stopper, and on the other hand of a side branch extending from the central portion of the straight length and connected to the steam headers. When it is desired to introduce a tracer gas into a tube of the bank of tubes, for example in order to check its leaktightness, the stopper closing the end of the straight portion of the corresponding connection is removed and in its place is connected a pipe introducing the tracer gas into the connection and consequently into the corresponding tube. With an arrangement of this kind, all the connections must necessarily be provided with a removable stopper of this kind, so that there is a very large number of stoppers, one for each connection, since it is not possible to tell in advance which tube will require intervention. However, intervention on a connection for the purpose of introducing a tracer gas is an exceptional operation, which is carried out very rarely and on a very limited number of connections, so that the steam generator is thus provided with a large number of removable stoppers the majority of which will probably remain in position throughout the entire life of the installation. This large number of removable stoppers raises the cost price of the installation and reduces its reliability in respect of leaktightness, without really improving the ease of intervention for the purpose of leak detection.

The present invention makes it possible to obviate these various disadvantages.

SUMMARY OF THE INVENTION

The invention therefore relates to a steam outlet connection intended to be disposed between the outlet of a tube of the bank of tubes of a steam generator and the pipe connecting this tube to a steam header, this connection being of the type comprising a straight tubular portion connected by welding at one of its ends to the outlet of the tube of the bank and closed at its other end, and a tubular portion attached as a side branch to the straight portion and joined by welding at its other end to the connecting pipe leading to the header. According to the invention, the closed end of the straight portion has an end wall of sufficiently slight thickness to permit its easy perforation for the purpose of injecting a gas into the tube through the aperture thus formed.

According to a preferred embodiment of the invention, the closed end is provided with external radial ribs intended to constitute fastening and reaction points for an apparatus for perforating the end wall.

BRIEF DESCRIPTION OF THE DRAWINGS

The invention will be better understood by referring to one particular embodiment given by way of example and illustrated in the accompanying drawings.

FIG. 1 is a partial diagrammatical view in section of a steam generator provided with connections in accordance with the invention.

FIG. 2 is a longitudinal section of a connection on the line II—II in FIG. 3.

FIG. 3 is an end view in the direction of the arrow III in FIG. 2.

FIG. 4 shows, mounted at the end of a connection, an apparatus permitting the perforation of the end wall of the connection and the introduction of pressurized gas.

DETAILED DESCRIPTION OF A PREFERRED EMBODIMENT

Reference will first be made to FIG. 1, which shows the general construction of a steam generator comprising a cylindrical casing 1, in which a heat transfer fluid, introduced through the inlet pipe 2, circulates from top to bottom. The heat transfer fluid may for example be liquid sodium in the case of a sodium cooled nuclear boiler. The generator also comprises a bank of tubes consisting of a large number of tubes 3 coiled helically in the vessel 1; in order to maintain the diagrammatical character of the drawing, only one of the numerous tubes 3 constituting the bank of tubes is shown here. Pressurized water is introduced at the bottom end (not shown in the drawing) of each tube 3. In the course of its upward movement the water is progressively vaporized by absorption of the heat of the liquid sodium bathing the outside walls of the tube. At its top end 5 the tube 3 passing through the wall 1 of the vessel therefore contains water vapor, which will be collected in a header 6 intended to receive the steam coming from a large number of tubes such as 3. An outlet connection 7 of general T-shape makes the connection between the outlet end 5 of the tube 3 and a connector tube 8 leading to the header 6.

The connection 7 is shown in greater detail in FIGS. 2 and 3, in which it will be seen that it comprises a straight portion 10 directly butt welded at 11 to the end 5 of the tube of the bank of tubes. The other end of the portion 10 is butt welded at 12 to a member 13 forming a stopper. The member 13 is closed by an end wall 14 delimited by a concave inner wall 15 of substantially spherical or basket handle arch shape, and by an external wall 16 which is substantially plane, at least in its central portion. Around the central portion 16 the end of the member 13 forms a plane annular support surface 17. The member 13 is also provided with radial ribs 18 projecting from part of the external cylindrical surface.

The end wall 14 of the member 13 thus has good mechanical resistance to the pressure prevailing during operation in the tube 3 and the connection 7, because of the spherical shape of the wall 15. Nevertheless, the central portion of this end wall 14 is of slight thickness.

The connection 7 also has a branch 19 opening in the central part of the straight portion 10 and butt welded at 20 by its other end to the connector tube 8.

When, during a stoppage of the steam generator, it is desired to introduce a tracer gas into a tube 3, which then contains no steam, in order to check its leaktightness, use is made of an apparatus 22 such as that shown in section in FIG. 4. At its end the apparatus 22 is provided with a system of clamps 23 and grooves matching the ribs 18 on the member 13, making it possible, by means of a bayonet-type fastening, to lock and clamp the apparatus 22 against the outer face of the member 13, leaktightness being provided by an O-ring seal 24 bearing against the annular supporting surface 17.

The member 22 has a central bore 25 open towards the member 13 and receiving a longitudinally movable piston 26 provided with a seal 27. The piston 26, which carries a tapered point 28, is fastened to a rod 29 and to an operating wheel 30. A part of the rod 29 forms a screw 31 engaged in a matching threaded portion in the body of the apparatus 22. A lateral duct 33 leads into the bore 25 and has a threaded portion 34 making it possible to connect to it an external pipe 35, shown simply in dash-dot lines in the drawing.

With the apparatus 22 in position on the end of the member 13, as shown in FIG. 4, and with the pipe 35 connected to the reservoir of tracer gas which is to be introduced into the connection 7, it can be seen that the gas is held back by the end wall 14 and the seals 24 and 27. In order to introduce the gas into the connection 7, and thus into the tube 3, it is sufficient to operate the wheel 30 in the direction advancing the screw 31 to the left; the point 28 will then perforate the end wall 14 in its portion of least thickness, so that after the point has been slightly withdrawn, if necessary, the gas will flow from the pipe 35 to the interior of the connection 7 through the aperture thus formed and made free.

When the test requiring the introduction of gas has been completed, it is sufficient to remove the apparatus 22, and then to cut through the end of the straight portion 10 of the connection 7 in order to remove the perforated member 13. A new member 13 will then be welded to the severed end and will once again effect closure when the generator is put back into operation.

It will readily be understood that the arrangement thus described has great reliablity in respect of leaktightness during normal operation, while still being economical to produce. It also greatly facilitates the fitting in position of the gas introduction means when it is found necessary to check the tube in question in the bank of tubes.

The invention is obviously not strictly limited to the embodiment described above as an example, but it also covers embodiments which differ therefrom only in respect of details or variations of construction or in respect of the use of equivalent means. Thus, although this would no doubt entail more meticulous construction, the closure member 13 could also be integral with the actual connection 10. In this case, after perforation of the end wall 14 in order to introduce gas, the procedure would be as described above, the end of the connection being cut off and the end portion removed being replaced by a member 13 which would then be welded to the connection.

We claim:

1. A steam outlet connection intended to be disposed between the outlet (5) of a tube (3) of a bank of tubes of a steam generator and a pipe (8) connecting this tube to a steam header, said connection comprising a straight tubular portion (10) welded at one of its ends to said outlet and closed at its other end, and a tubular portion (19) attached as a side branch to said straight portion and at its other end to said connecting pipe (8) leading to said steam header, wherein said closed end of said straight portion (10) has an end wall (14) of a thickness sufficiently slight to permit its easy perforation for the purpose of injecting a gas into the tube through an aperture formed by said perforation of said end wall (14).

2. A connection as claimed in claim 1, wherein said closed end is provided with external radial ribs (18) forming fastening and reaction points for an apparatus (22) for perforating said end wall.

3. A connection as claimed in claim 2, wherein the external part of said end wall of said straight portion has an annular supporting surface (17) surrounding the part of slight thickness and servicing as support for a seal.

4. A connection as claimed in any one of the preceding claims, wherein said end wall (14) of said straight portion has, towards the interior, a substantially spherical concave surface (15) and, towards the exterior, a substantially plane central portion (16).

* * * * *